Sept. 30, 1941.   C. E. PARKER   2,257,398
COOKING TOP SUPPORT
Filed Feb. 29, 1940
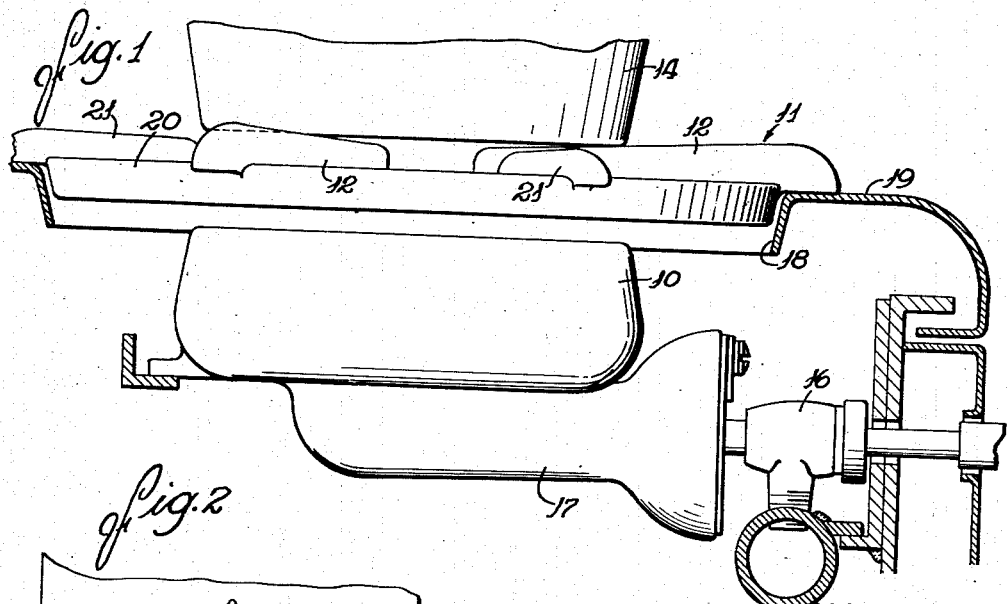
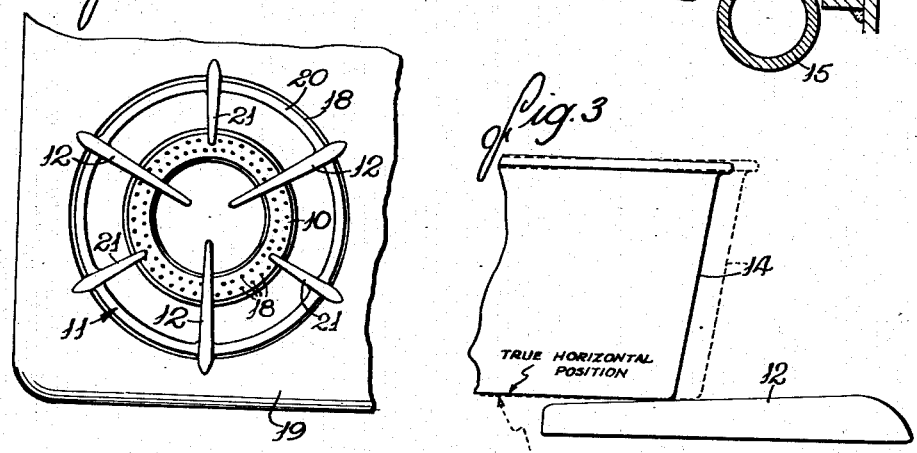
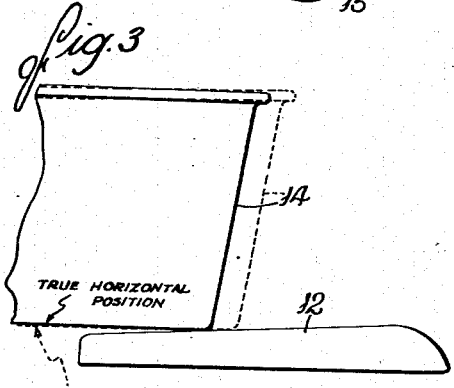
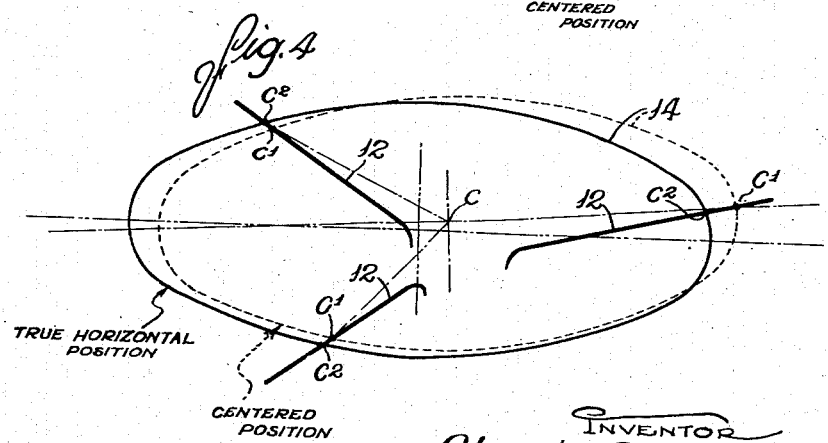
INVENTOR
Claude E. Parker
ATTORNEYS Patented Sept. 30, 1941

2,257,398

UNITED STATES PATENT OFFICE 2,257,398

COOKING TOP SUPPORT

Claude E. Parker, Chicago, Ill., assignor to Gas Products Corporation, Chicago, Ill., a corporation of Illinois Application February 29, 1940, Serial No. 321,498

1 Claim. (Cl. 126—214)

The present invention relates to utensil supports for cooking tops of ranges or cooking stoves. The present application is a continuation in part of my copending application Serial No. 272,984, filed May 11, 1939.

Generally stated, it is an object of the present invention to provide a cooking top utensil support of such character that a pan or other utensil resting upon it may be readily slid into a level position even though the stove itself is not level, due to the pitch of the floor or for some other reason. In the illustrative construction this object has, in brief, been accomplished by providing three utensil supporting arms which lie along equidistant radii from the center of an underlying burner and are sloped inwardly toward such center. Consequently, a skillet or other utensil placed on these supports can be readily shifted so that it contacts them at three spaced points, one for each support, and which points lie in a common horizontal plane even though the utensil supporting structure as a whole is canted.

Further objects and advantages of the invention will become apparent as the following description proceeds, taken in connection with the accompanying drawing in which:

Figure 1 is a side elevation, partially in section, of a stove cooking top embodying the invention.

Fig. 2 is a fragmentary plan view of the cooking top.

Fig. 3 is a side elevation of one of the utensil supporting arms with a pan shown in different positions on it.

Fig. 4 is a generally schematic perspective view of the utensil supporting arm layout, and indicating different planar positions of a utensil on it.

Referring more particularly to Fig. 1, a cooking top structure is shown thereon including a utensil supporting arrangement embodying the present invention. To identify briefly its principal elements, the cooking top shown includes a gas burner head 10 and an overlying utensil support 11 comprising three arms 12 (see also Fig. 2) lying along substantially equidistantly spaced radii from the burner head center. These arms 11 have been shown as supporting a utensil, indicated at 14.

The burner head 10 may be of any suitable well known form and, consequently, no detail of description is required here. In the particular construction shown the head is supplied with gas from a manifold 15, under the control of a manually operated valve 16. The gas passes from the valve 16 into a Venturi supply tube 17 in which it is mixed with primary air, in the usual manner, and passes through the chambered interior of the head 10 to a series of fuel emission ports 18 in the top of the head and underlying the utensil 14. The head is mounted beneath a round aperture 18 (Fig. 2) in a sheet metal stove top plate 19.

The utensil supporting means or grate 11 comprises, in the present instance, a cast iron border ring 20 (Figs. 1 and 2) on which the arms 12 are integrally formed. Their outer ends project beyond the ring to engage the top plate 19 and thus removably support the grate 11 in the aperture 18. Such details are of no particular consequence to the present invention, the feature of prime importance being the provision of, first, three substantially equidistantly spaced radial arms and, second, the sloping of the top surfaces of these arms gradually downward and inward toward the center of the structure (see Figs. 1 and 3) and at substantially equal angles.

With the three utensil supporting arms 12 spaced and sloped downwardly and inwardly as described, the utensil 14 can be leveled easily and accurately despite any more or less unavoidable slope of the stove top structure. That the top of a stove is likely to be sloped or canted, in actual use, will be appreciated by those familiar with the problems of the art. This slope may be caused by the pitch of the floor on which the stove is mounted, variations in the length of the stove legs, or various other similar factors. To correct them, and exactly level each stove installed, is ordinarily prohibitively expensive. On the other hand, to have the stove top out of the horizontal often materially interferes with good cooking. For example, it causes the grease in a skillet to flow to one side so that articles being fried in it are unevenly cooked. Similarly, the liquid contents of a sauce pan flows to one side so that it more easily boils over the lip of the low side of the pan.

A user's natural impulse is to place a utensil in centered position over the burner. In case the cooking top is not level the utensil will be correspondingly tilted when in such centered position, but with the present arrangement it can be quickly slid in any necessary direction to a truly level position. For example, in Fig. 4 the points C' on the arms 12 are all equidistant from the center C and therefore the bottom of a utensil centered on the arms and contacting the arms at these points would be tilted at the same angle as the cooking top, the outline of the utensil bottom being indicated in dotted lines 14. To level it the utensil is slid laterally (to the left in this instance) until it is righted. Thus the points of contact on the two left arms move outward and up, due to the slope of the arms, while the point of contact on the right hand arm moves in and down. The final points of contact $C^2$ all lie in a true horizontal plane, the outline of the bottom of the utensil 14 being shown in full lines for such position. The change in position of the utensil, as viewed in elevation, is also shown in Fig. 3.

The point of exact leveling for the utensil is easily determined by observing the position of its liquid contents. Consequently, the leveling action is almost automatic as the user places the utensil on the supporting structure since the natural impulse is, when possible, to shift it to a position in which the liquid contents appears to be level.

By using three utensil supporting arms, rather than a greater number, firm support is assured for the utensil no matter what lateral direction it may be moved in to level it. In other words, three points are the minimum required to define a plane, and so no matter what lateral direction the utensil is moved in it will always have three coplanar points of contact with the arms 11. If four arms were used, on the other hand, the utensil would, except when centered, contact only three of the four arms and would rock back and forth between two possible sets of three contacting arms in an insecure and unstable manner.

To make possible such wide spacing between the main utensil supporting arms, as is necessary when only three of them are used, three supplemental or auxiliary supporting elements 21 are arranged intermediate the main arms 12 (Fig. 2). The arms 21 may also be made integral with the grate border ring 20. Their top surfaces are, however, disposed below the seating surfaces on the principal utensil supports 12 (Fig. 1) and the arms 21 may be somewhat shorter than the arms 12 (Fig. 2). When a rigid flat bottomed utensil is placed on the grate it is not contacted by the auxiliary arms 21 and so they do not interfere in any way with the leveling action described. The arms 21 do, however, prevent a small utensil from falling or tilting down into the relatively wide spaces intermediate the arms 12. In the same way they prevent excessive drooping of the overlying portion of a warped or limber bottomed utensil which would otherwise prevent proper escape of the products of combustion from the burner. The auxiliary elements 21 thus make practical and safe the use of the three-arm system set forth and yet do not interfere with the almost automatic leveling action which the latter achieves.

I claim as my invention:

A utensil supporting structure for cook stove tops comprising three arms lying respectively along three substantially equidistant radii from the center of an underlying burner and all having top surfaces sloping gradually inward and downward toward such center at substantially equal angles, and auxiliary supporting elements between said arms presenting top surfaces disposed below the top surfaces of said arms so as to be normally out of contact with a flat utensil bottom seated upon said arms and in centered position above the burner.

CLAUDE E. PARKER.